United States Patent [19]
Bartholomä et al.

[11] Patent Number: 6,082,782
[45] Date of Patent: Jul. 4, 2000

[54] CONNECTION FITTING HAVING AN AXIALLY PROTRUDING FASTENING PROJECTION

[75] Inventors: Mario Bartholomä, Winden; Volker Götz, Kenzingen; Fritz Zügel, Waldkirch; Jürgen Adolf, Denzlingen, all of Germany

[73] Assignee: Anton Hummel Verwaltungs GmbH, Waldkirch, Germany

[21] Appl. No.: 09/238,352

[22] Filed: Jan. 27, 1999

[30] Foreign Application Priority Data

Feb. 6, 1998 [DE] Germany .................... 198 04 719

[51] Int. Cl.⁷ .................................................. F16L 3/04
[52] U.S. Cl. ................. 285/140.1; 208/319; 208/906; 208/921; 174/65 R
[58] Field of Search ................. 174/65 R, 153 R; 285/154.1, 206, 139.3, 140.1, 141.1, 196, 205, 208, 194, 319, 921, 906

[56] References Cited

U.S. PATENT DOCUMENTS

| | | | |
|---|---|---|---|
| 3,221,572 | 12/1965 | Swick | 285/140.1 X |
| 3,415,549 | 12/1968 | Chatham | 285/140.1 X |
| 3,836,269 | 9/1974 | Koscik | 285/140.1 X |
| 5,068,496 | 11/1991 | Favalora . | |
| 5,204,499 | 4/1993 | Favalora . | |

FOREIGN PATENT DOCUMENTS

| | | |
|---|---|---|
| 0 360 632 A1 | 3/1990 | European Pat. Off. . |
| 196 47 013 A1 | 8/1997 | Germany . |

*Primary Examiner*—Dave W. Arola
*Attorney, Agent, or Firm*—Akin, Gump, Strauss, Hauer & Feld, L.L.P.

[57] ABSTRACT

A connection fitting (1) is provided for fastening long bodies, such as hoses, particularly corrugated hoses (2), but also pipes or cables, to an opening (3), for example in a wall (4) of a housing. The fitting (1) has a fastening projection (5), protruding axially in the plug-in direction (Pf1), which is divided into retaining tongues (7) by slots (6). Retaining projections (8) are arranged protruding approximately radially outwardly from these retaining tongues. When the fastening projection (5) is inserted into the opening (3) or similar passageway, the retaining tongues (7) are deformed radially inwardly by an edge (10) of the opening (3) against a restoring force, and arrive at their fastening position beyond the opposing edge (9) of the opening (3), whereby the retaining projections (8) grasp behind this edge (9). Spaced axially from the retaining projections (8), a detent is arranged which rests in the fastening position on the opening edge (10) lying opposite the edge (9) of the opening (3) which has been grasped behind, i.e. the edge (10) which is the front edge in the plug-in direction. This detent includes an elastic ring (11) supported on an angled surface (12) of the connection fitting (1) that widens outwardly obliquely away from the opening (3). The ring (11) is pressed against this angled surface (12) and/or displaced in the axial direction on this angled surface (12) under elastic deformation and/or under expansion of its diameter against a restoring force. In this process, this elastically flexible ring (11) can simultaneously have a sealing function.

10 Claims, 3 Drawing Sheets

CONNECTION FITTING HAVING AN AXIALLY PROTRUDING FASTENING PROJECTION

BACKGROUND OF THE INVENTION

The invention involves a connection fitting for fastening or coupling long bodies, for example hoses, corrugated hoses, pipes, cables, or the like, to an opening, especially to a passageway or a hole, for example in a wall of a housing or the like, wherein the connection fitting has an axially protruding or extending fastening projection in the plug-in direction, which is divided into retaining tongues by slots running essentially in the axial direction. On the outer side of these tongues, at least in the fastening position, are arranged approximately radially outwardly protuding retaining projections, such that when the fastening projection is inserted into the opening of the passageway or similar opening, the retaining tongues reach beyond the edge of the opening in the fastening position. The retaining tongues grasp at least partially behind this edge, and spaced from the retaining projections at least one detent is arranged which, in the fastening position, rests against the oppositely-lying opening edge of the opening which has been grasped behind.

A connection fitting of this type is known, for example, from U.S. Pat. No. 5,068,496. In order to be able to compensate for different thicknesses or strengths of the housing wall or different spacings of the two side edges of the opening, according to this patent, a take-up nut or coupling ring is provided which can be screwed on the outer side of the connection fitting and is thereby axially adjustable, with the front end facing the housing wall forming an adjustable detent. Depending on the thickness or strength of the wall, this coupling ring can be adjusted through a greater or lesser distance in the axial direction by the screw movement, so that the opening edges are thereby clamped between the retaining projections of the fastening projections, on the one hand, and the coupling ring, on the other hand. This constitutes a relatively expensive construction, both with respect to manufacturing and assembly. The actual connection fitting thus requires a threading on the outer side and, in addition, the coupling ring screwable onto this threading. Furthermore, the appropriate adjustment of this coupling ring into the proper position is necessary during assembly.

SUMMARY OF THE INVENTION

Thus, an object of the invention is to create a connection fitting of the type described at the outset, that can likewise be mounted onto openings, holes, or passageways of housing walls having different wall thicknesses, without an outside threading and without a screw-fastening being necessary.

This apparently contradictory object is achieved according to the invention in that the detent is an elastic or elastomeric (e.g., rubber) ring, which is supported on a surface of the connection fitting that widens obliquely from inside to outside away from the opening, and is movable or displaceable in the axial direction on this angled surface by elastic expansion of its diameter against its restoring force. The detent is thus formed by the combination of the surface which, in the fastening position, widens at an angle away from the opening and the elastic ring arranged between the housing wall and this angled surface. The thicker the housing wall, the more the ring is forced back on the angled surface upon axial insertion of the fastening projection and thus at the same time, in view of its circumference, expanded against its elastic restoring force. In the process, it can also be compressed somewhat in the axial direction against its elasticity and restoring force. Since an elastomeric ring is reduced somewhat, in terms of its own cross-section, during expansion, but simultaneously the resistance against further deformation increases, a firm detent results, which compensates automatically for different wall thicknesses. In an especially advantageous way, irregularities of the wall thicknesses are likewise spanned or compensated for simultaneously by this elastomeric ring.

An especially cost-effective arrangement results if the abutment ring is an O-ring. Such O-rings can be obtained at a very reasonable price as commercially available sealing rings and allow a certain expansion and compression, so that a very reasonably priced solution results. Furthermore, an O-ring of this type, manufactured from an elastomeric material, can thus be suitably well deformed and fitted and thereby surpasses a ring consisting, for example, of one or more wire windings. Furthermore, an O-ring of this type, because of the rounded or circular cross-section—running transverse or radially to its circumference—, can be displaced especially well on an angled surface or supporting surface in the axial direction with simultaneous expansion of its circumference. In the process, the abutment ring area formed by it remains practically unchanged, aside from the diameter enlargement.

The angled support surface for the abutment ring can have straight and/or curved contour lines, so that it forms a truncated cone, which is optionally at least partialy convex or concave.

If the support surface has totally the form of a truncated cone, a constant expansion of the abutment ring results from its axial displacement. By partially straight, partially curved contour lines, which thereby form a crowned or a sunken surface, the support surface can be designed in such a manner, however, that the expansion of the abutment ring progresses in a superproportional or subproportional manner with increasing wall thicknesses of the housing wall, for example, as a function of the elasticity of the material of the abutment ring. For example, the support surface could be curved in a somewhat crowned manner, so that its angle of slope becomes smaller and smaller with increasing radius in the axial direction, i.e., the abutment ring must be expanded less and less for larger wall thicknesses, in order to make possible the desired fitting.

The internal longitudinal cavity of the fitting connection can be continued up into the fastening projection or pass through it, and the long body can extend axially, in the fastening position, until it reaches between the retaining tongues and/or protrudes axially in relation to these fastening tongues. In the fastening position for a design of this type, the long body effects a fixation of the retaining tongues in their fastening and rest position, thus locking the connection fitting against an undesired release which, for example, is then expedient if the connection fitting and the housing receiving it are subject to dynamic stresses.

On the whole, a connection fitting results which is very simple in its construction, because the adaptation to different wall thicknesses through an elastomeric detent ring can occur practically automatically, and wherein a particular additional advantage consists in that the detent ring simultaneously produces a seal of the fitting in relation to the housing opening. In this manner, the detent ring possesses a double function because, on the one hand, it allows the thickness adaptation and, in the process, simultaneously exercises a sealing effect.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings, in partially schematic form.

DETAILED DESCRIPTION OF THE INVENTION

In the following described embodiments, parts having the same or similar functions have the same reference numbers.

Figure 1:
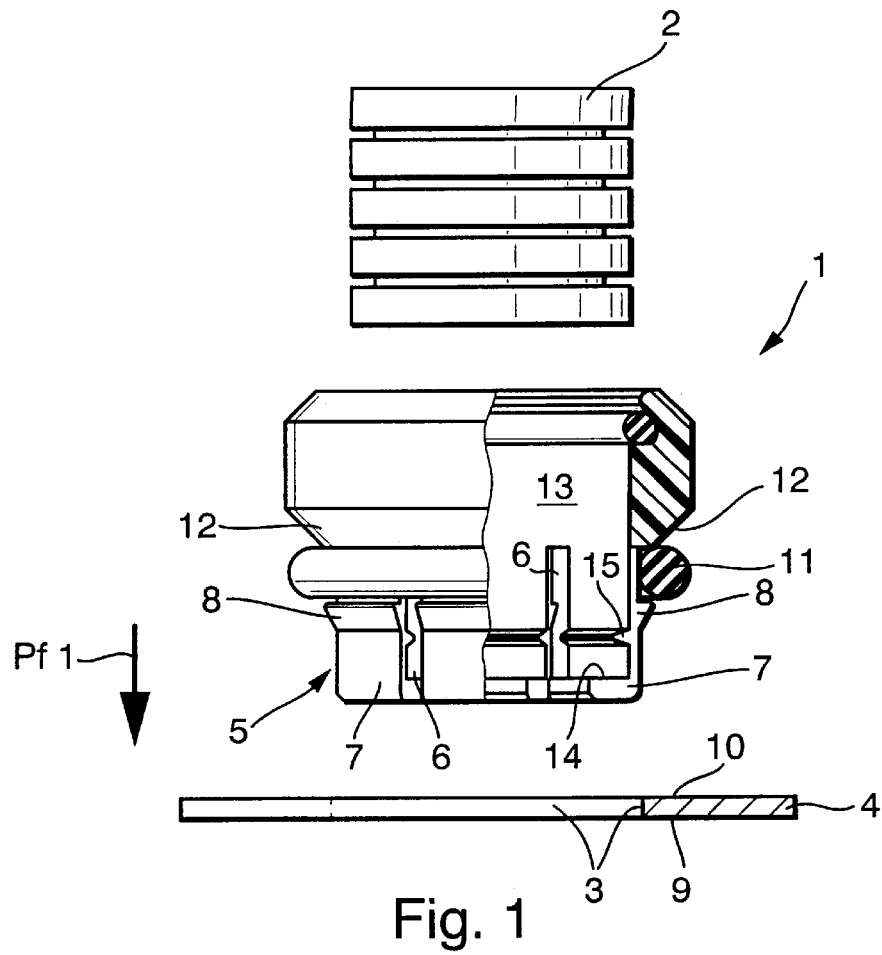
FIG. 1 shows a connection fitting according to the invention, depicted half in longitudinal section and the other half in a side view, prior to its fastening on a housing wall provided with an opening, and prior to the insertion and attachment of a corrugated hose.
Figure 3:
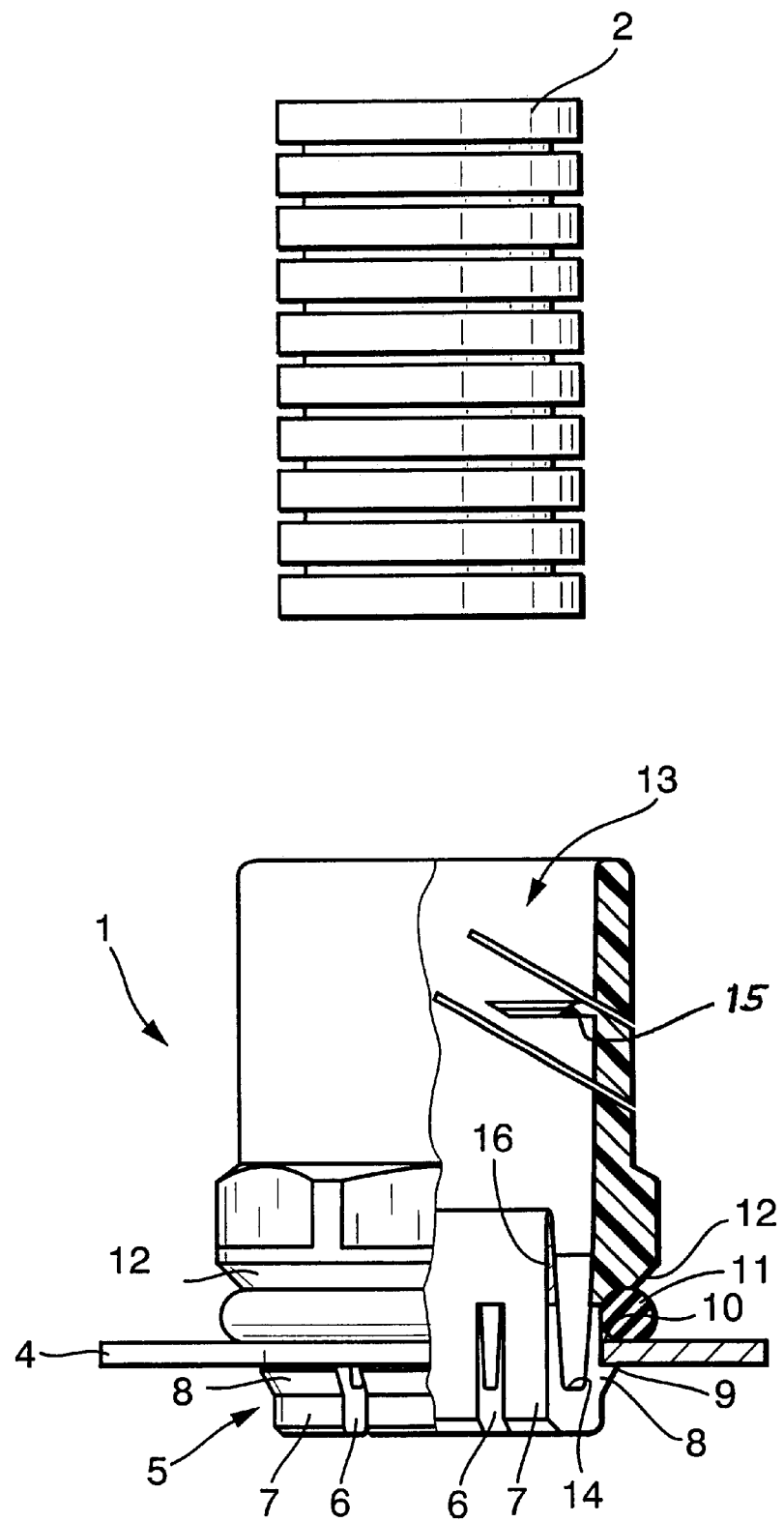
FIG. 3 shows a modified embodiment of a connection fitting according to the invention, already plugged into and affixed to an opening of a housing wall, in which a long body in the form of a corrugated hose is still to be plugged in so as to be attached.
Figure 4:
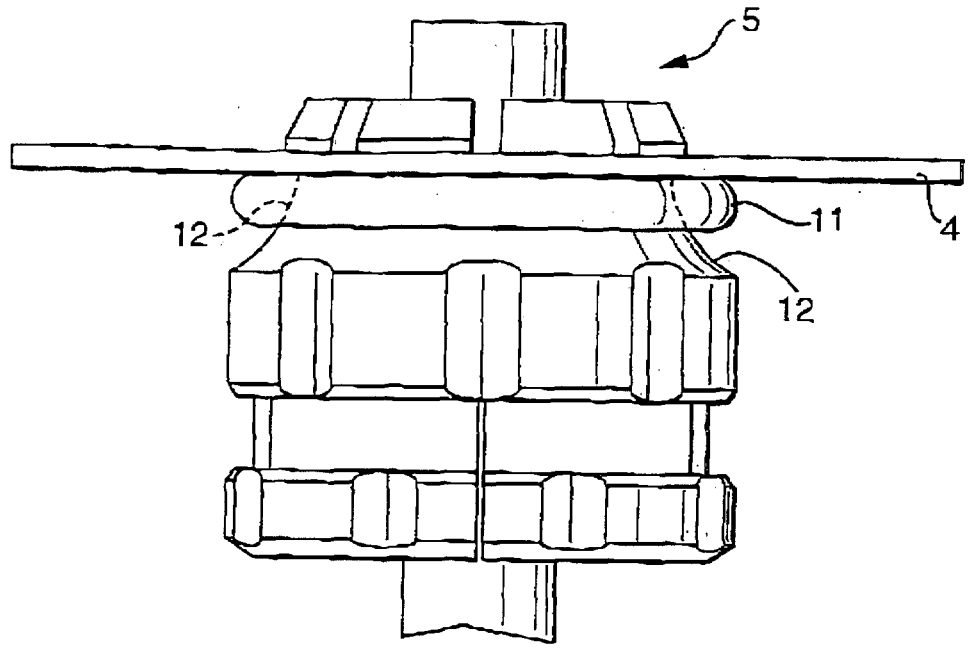
FIG. 4 shows a modified embodiment of a connection fitting according to the invention already plugged into and affixed to an opening of a housing wall, in which the angled support surface has convex contour lines.
Figure 5:
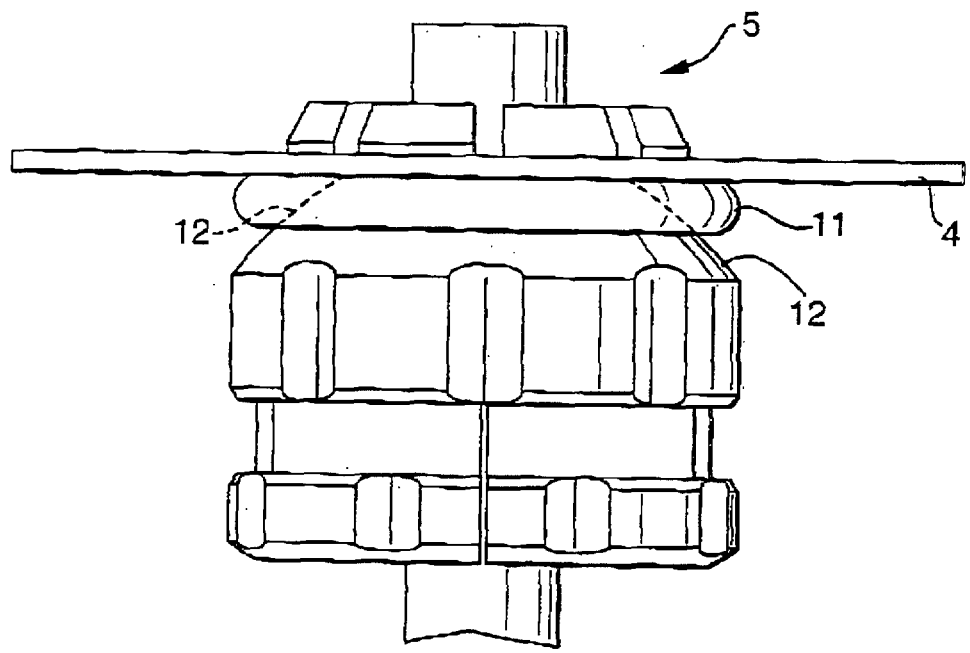
FIG. 5 shows a modified embodiment of a connection fitting according to the invention already plugged into and affixed to an opening of a housing wall, in which the angled support surface has concave contour lines.

A connection fitting, indicated as a whole by 1, recognized especially well in FIG. 1, but also in FIG. 3 in modified form, functions for the attachment of long bodies, in the embodiment shown for the fastening of a corrugated hose 2, to an opening 3, for example, to a passageway or a hole in a wall 4, for example of a housing or the like.

The connection fitting 1 thus has a fastening projection 5, protruding axially in the plug-in direction indicated in FIG. 1 by the arrow Pf1, which is divided into retaining tongues 7 by slots 6 running essentially in the axial direction, on whose outer side retaining projections 8 protruding radially outwardly are arranged. Upon insertion of the fastening projection 5 and thus the retaining tongues 7 into the opening 3, according to FIGS. 2 and 3, the retaining projections 8 extend beyond the edge 9 of this hole 3 in the fastening position, in which the retaining projections 8 grasp behind this edge 9. They have for this an approximately sawtooth-like cross-section in the embodiment shown, i.e., opposite the plug-in direction their height increases gradually up to their largest radial dimension, and then tapers off relatively steeply or lies in a radial plane, wherein this steep drop is in active connection with the hole edge 9 in the fastening position.

Figure 2:
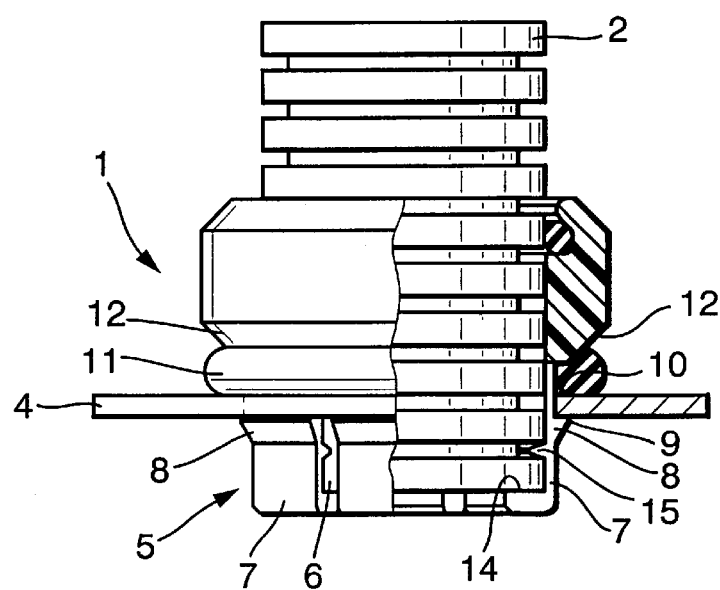
FIG. 2 is a representation, corresponding to FIG. 1, of the connection fitting in the fastening position, i.e., after the plugging into an opening of a housing wall or the like and after the attachment of an long body in the form of a corrugated hose to and in this fitting.

Spaced from the retaining projections 8 and their steep detent surface, a detent, to be described in greater detail, is arranged, which in the fastening position rests on the opening edge 10 lying opposite the edge 9 of the opening 3 that is being grasped behind, as shown in FIGS. 2 and 3.

The detent is thus according to FIGS. 2 and 3, insofar as it concerns the direct arrangement on the opening edge 10, an elastomeric ring 11, which is supported on a widening surface 12 of the connection fitting 1, the surface angling away from the opening 3 from inside to outside. The detent is thus totally formed by this angled surface 12 and the ring 11 lying on it. Compared to a starting position according to FIG. 1, because of this arrangement, the ring 11 can be compressed on this angled surface 12 with possible enlargement of its diameter against a restoring force, and can be displaced somewhat in the axial direction.

In contrast to the representations according to FIGS. 2 and 3, such an axially greater adjustment of the abutment ring 11 will then occur when the thickness of the wall 4 is larger. Thus, because of the elasticity of the ring 11 and the angled surface 12, whose smallest diameter can somewhat engage the ring 11, an automatic adaptation to the various thicknesses or strengths of the wall 4 is possible. If the wall 4 is somewhat thicker, the connection fitting 1 must only be plugged into the opening 3 with somewhat greater force, until the retaining projections 8 reach beyond the edge 9 to be grasped from behind and are caught there. As a result, the ring 11 is then correspondingly more greatly deformed and, because of the angled surface 12, under certain circumstances, the ring is also expanded somewhat, when it is somewhat axially displaced on this angled surface 12.

A special screwed sheath or the like is thus not necessary as an opposing detent and for adjustment to the wall thickness.

In the embodiment the abutment ring 11 is an O-ring, that can be obtained inexpensively in almost any desired size and, in addition to the automatic adaptation to various wall thicknesses, also simultaneously produces a seal of the connection fitting in the area of the opening 3 on this wall. Thus, this ring 11 has an advantageous double function.

The angled support surface 12 has, in the embodiment shown, straight contour lines, so that it thus forms a truncated cone. Optionally, however, it could also be designed as convex or concave, at least in some areas, in order to effect the widening of the detent ring 11 superproportionally or subproportionally, depending on the wall thickness.

The inner longitudinal cavity 13 of the connection fitting continues up to the area of the retaining projections 8 and even beyond that. In the fastening position the long body, i.e., the corrugated hose 2 in the embodiment, thus extends between the retaining tongues 7 and thereby improves their anchorage, because they cannot be pulled back out of their resting position, even under dynamic loading or due to being pulled at an angle, but instead can be impeded by the corrugated hose 2 from this type deformation in the opening direction.

In the embodiment according to FIGS. 1 and 2 the retaining tongues 7 thus contain on their ends a radially inwardly projecting stop 14, on which the corrugated hose 2 sits in the fastening position after being caught by an inside rib 15.

In the embodiment according to FIG. 3, a stop 14 on the retaining tongues 7 is extended to an inside support sheath 16, while the catching of the corrugated hose 2 is accomplished in a known manner by way of an anchorage 15 located above the ring 12 on the fitting connection.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. A connection fitting (1) for fastening long bodies to an opening (3), comprising a fastening projection (5) protruding axially from a body of the fitting in a plug-in direction (Pf1), the projection (5) being divided into a plurality of retaining tongues (7) by slots (6) running essentially in an axial direction, the retaining tongues (7) having retaining projections (8) arranged on their outer side and projecting approximately radially outwardly therefrom, at least in the fastening position, such that upon insertion of the fastening projection (5) into the opening (3) the retaining tongues (7) extend beyond a first edge (9) of the opening (3) in the fastening position and the retaining projections (8) grasp at least partially behind the first edge (9), and at least one detent axially spaced from the retaining projections (8) and resting in the fastening position on a second edge (10) lying on an axially opposite side of the opening (3) from the first edge (9) which has been grasped behind, wherein the detent comprises an elastic abutment ring (11) supported on an angled surface (12) of the connection fitting (1), the surface (12) widening outwardly obliquely away from the opening (3), and the abutment ring (11) being displaceable in the axial direction on the angled surface (12) under elastic expansion of its diameter against its elastic restoring force.

2. The connection fitting according to claim 1, wherein the abutment ring (11) is an O-ring.

3. The connection fitting according to claim 1, wherein the angled support surface (12) for the abutment ring (11) has straight contour lines so as to have a truncated cone shape.

4. The connection fitting according to claim 1, wherein the angled support surface (12) has concave or convex contour lines, at least in some areas of the surface.

5. The connection fitting according to claim 1, wherein the fitting has an inner longitudinal cavity (13) which extends into the fastening projection (5), and the long body extends in the fastening position into the longitudinal cavity (13) until it reaches between the retaining tongues (7).

6. The connection fitting according to claim 5, wherein the longitudinal cavity (13) extends through the fastening projection (5), and the long body extends in the fastening position axially beyond the retaining tongues (7).

7. The connection fitting according to claim 1, wherein the long body is selected from the group consisting of hoses, corrugated hoses, pipes, and cabels.

8. The connection fitting according to claim 1, wherein the opening (3) is a passageway or hole in the wall of a housing (4).

9. The connection fitting according to claim 8, wherein the ring (11) is displaceable on the surface (12) as a function of a thickness of the wall.

10. The connection fitting according to claim 1, wherein the ring (11) comprises an elastomeric material.

* * * * *